(12) United States Patent
Thomas

(10) Patent No.: US 6,749,375 B2
(45) Date of Patent: Jun. 15, 2004

(54) END MILLING CUTTER FOR MACHINING WORKPIECES MADE OF A NON-FERROUS METAL OR PLASTIC

(75) Inventor: Diethard Thomas, Ahrensburg (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 33 days.

(21) Appl. No.: 10/016,994

(22) Filed: Dec. 13, 2001

(65) Prior Publication Data

US 2002/0102140 A1 Aug. 1, 2002

(30) Foreign Application Priority Data

Dec. 15, 2000 (DE) .................................... 200 21 264 U

(51) Int. Cl.[7] .............................. B23B 27/00; B26D 1/12
(52) U.S. Cl. .......................................... 407/53; 407/63
(58) Field of Search ............................. 407/53, 119, 54, 407/61, 62, 63; 408/229, 230

(56) References Cited

U.S. PATENT DOCUMENTS

| | | | | |
|---|---|---|---|---|
| 3,157,938 A | * | 11/1964 | Sabberwal et al. ........... | 407/63 |
| 4,050,840 A | * | 9/1977 | Skingle ....................... | 408/144 |
| 4,721,421 A | * | 1/1988 | Klinger ........................ | 407/63 |
| 5,094,573 A | * | 3/1992 | Hougen ....................... | 409/132 |
| 5,209,612 A | * | 5/1993 | Kish ............................ | 407/54 |
| 6,056,485 A | * | 5/2000 | Magill et al. ................. | 407/54 |
| 6,368,030 B1 | * | 4/2002 | Sato et al. .................... | 407/53 |
| 2002/0067964 A1 | * | 6/2002 | Sekiguchi et al. ............ | 407/63 |

* cited by examiner

Primary Examiner—A. L. Wellington
Assistant Examiner—Brian D. Walsh
(74) Attorney, Agent, or Firm—Vidas, Arrett & Steinkraus, P.A.

(57) ABSTRACT

An end milling cutter for machining workpieces made of a non-ferrous metal or plastic including two or more helically shaped cutting edges between which helically shaped chip flutes are formed which define a chip-cutting face along with the cutting edges, and a tool flank each between the cutting edge and the chip flute which follows next wherein the tool flanks or tooth backs are facet-shaped such that they are composed of individual reference surfaces which are approximately planar and are disposed at an angle with respect to each other as viewed in a circumferential direction.

6 Claims, 2 Drawing Sheets

ENDMILLING CUTTER FOR MACHINING
WORKPIECES MADE OF A NON-FERROUS
METAL OR PLASTIC

CROSS-REFERENCE TO RELATED
APPLICATIONS

Not applicable.

STATEMENT REGARDING FEDERALLY
SPONSORED RESEARCH

Not applicable.

BACKGROUND OF THE INVENTION

This invention relates to an end milling cutter for machining workpieces made of a non-ferrous metal or plastic.

End milling cutters the machining portion of which comprises helically shaped cutting edges with helically shaped chip flutes therebetween are generally known. It is also known to provide so-called roughing cutters with a chip splitter profile in which the tool flank is interrupted by parallel-extending flutes.

In machining workpieces made of a non-ferrous metal or plastic, it is desirable to provide a large positive rake angle and a large positive clearance angle and a relatively small tool wedge angle (having a sharp profile), at the same time. The tool flank usually is on a spiral as viewed in a section. If a large rake angle and a large clearance angle are aimed at, which results in a wedge angle of from 40 to 60°, for example, this will impair the stability of the milling cutter. Therefore, a compromise has to be made between the stability of the milling cutter, on one hand, and the desired cutting characteristics, on the other.

It is the object of the invention to provide an end milling cutter for machining workpieces made of a non-ferrous metal or plastic wherein optimum rake and clearance angles are obtained while the stability of the milling tool is improved.

BRIEF SUMMARY OF THE INVENTION

In the inventive end milling cutter, the tool flank or the back between adjacent chip flutes is facet-shaped such that it is composed of individual reference surfaces which are approximately planar, as viewed in a circumferential direction, and are disposed at an angle with respect to each other.

The inventive end milling cutter allows for a very small wedge angle, an optimum rake angle and clearance angle while the stability of the milling cutter tool portion remains sufficient. This also makes it possible to achieve high metal-cutting depths if the edge lengths of the end milling cutter are large enough.

Three or more reference surfaces are provided in an aspect of the invention. It is understood that the number of reference surfaces, their length in a circumferential direction of the end milling cutter, and the clearance angle determines the stability of the end milling cutter. However, the number of three or more reference surfaces which may be of approximately the same length is considered to be sufficient. Because of the invention, the chip flutes may be made to be very deep with no adverse effect exerted on stability. Large chip flutes are known to have a good chip-removing performance.

The angles which enclose the reference surfaces with respect to each other may be equal. However, it is also possible to choose differing angles. The rake angle in the front portion is preferably from 20 to 25°.

The inventive end milling cutter is preferably made of a high-speed steel or hard cutting metal. It goes without saying that the inventive milling cutter is not only suited for use as a finishing cutter, but also as a roughing cutter with a chip splitter profile as is known as such.

The invention will now be explained in more detail with reference to an embodiment thereof.

BRIEF DESCRIPTION OF THE SEVERAL
VIEWS OF THE DRAWINGS

DETAILED DESCRIPTION OF THE
INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
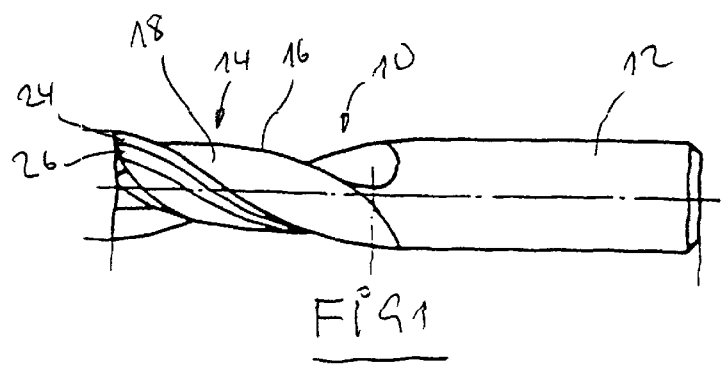
FIG. 1 shows a side view of an end milling cutter according to the invention.
Figure 2:
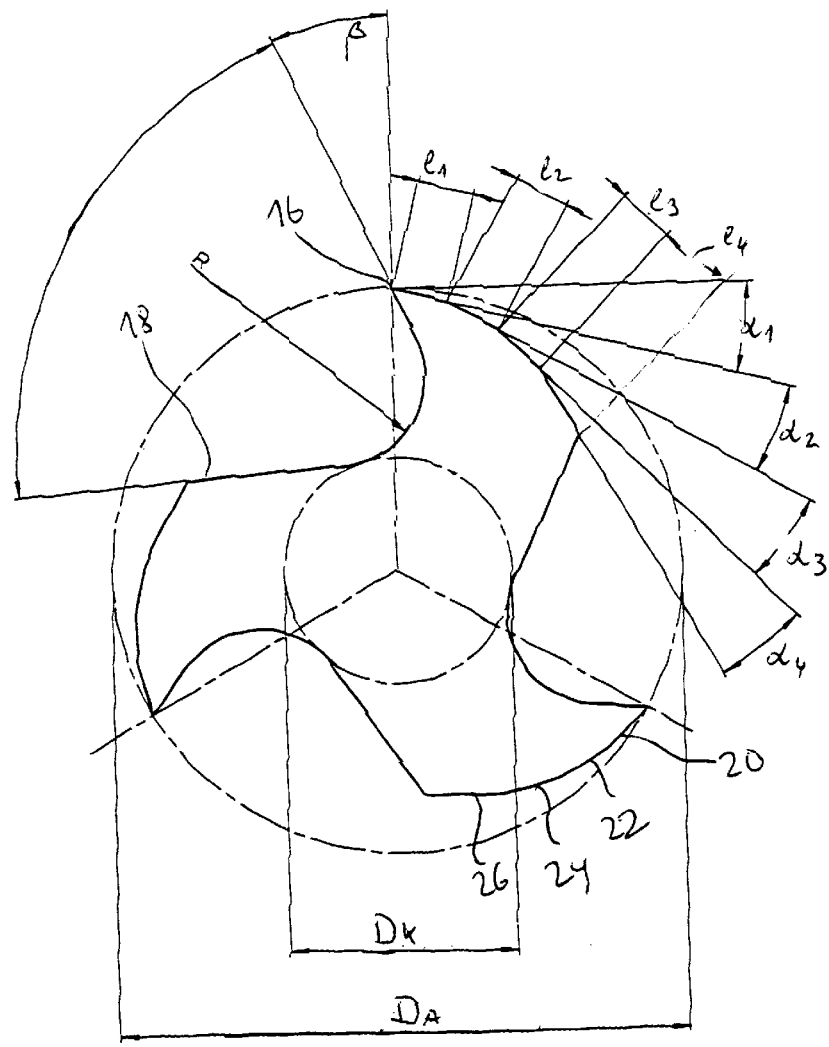
FIG. 2 shows a section in plane of rotation through the end milling cutter of FIG. 1 at a heavily enlarged scale.

Referring to FIG. 1, an end milling cutter 10 is shown which has a chucking portion 12 and a machining portion 14 which consists of three helically shaped cutting edges 16 which have a circumferential spacing of 120° each and possess respective chip flutes 18 therebetween. The profile of the machining portion 14 can be seen more clearly from FIG. 2. The outside diameter of the cutting edges is $D_A$ and the core diameter is $D_K$. It is preferred that the $D_K$ to $D_A$ ratio is between 0.4 and 0.7. The tool flank is subdivided into four reference surfaces 20, 22, 24, 26 which are successively disposed each in a circumferential direction. They are planar and are made by grinding. The lengths $l_1$ to $l_3$ of the reference surfaces 20 to 24 in the embodiment shown are the same as viewed in the circumferential direction of the end milling cutter 10. The length of the fourth reference surface 26 is somewhat larger because it necessarily connects to the next chip flute. As can further be appreciated the reference surfaces 20 to 26 each have an angle $\alpha_1$ to $\alpha 4$ of 15° with respect to each other, for example. The clearance angle $\alpha_1$ is preferably between 10 and 20°.

Figure 3:
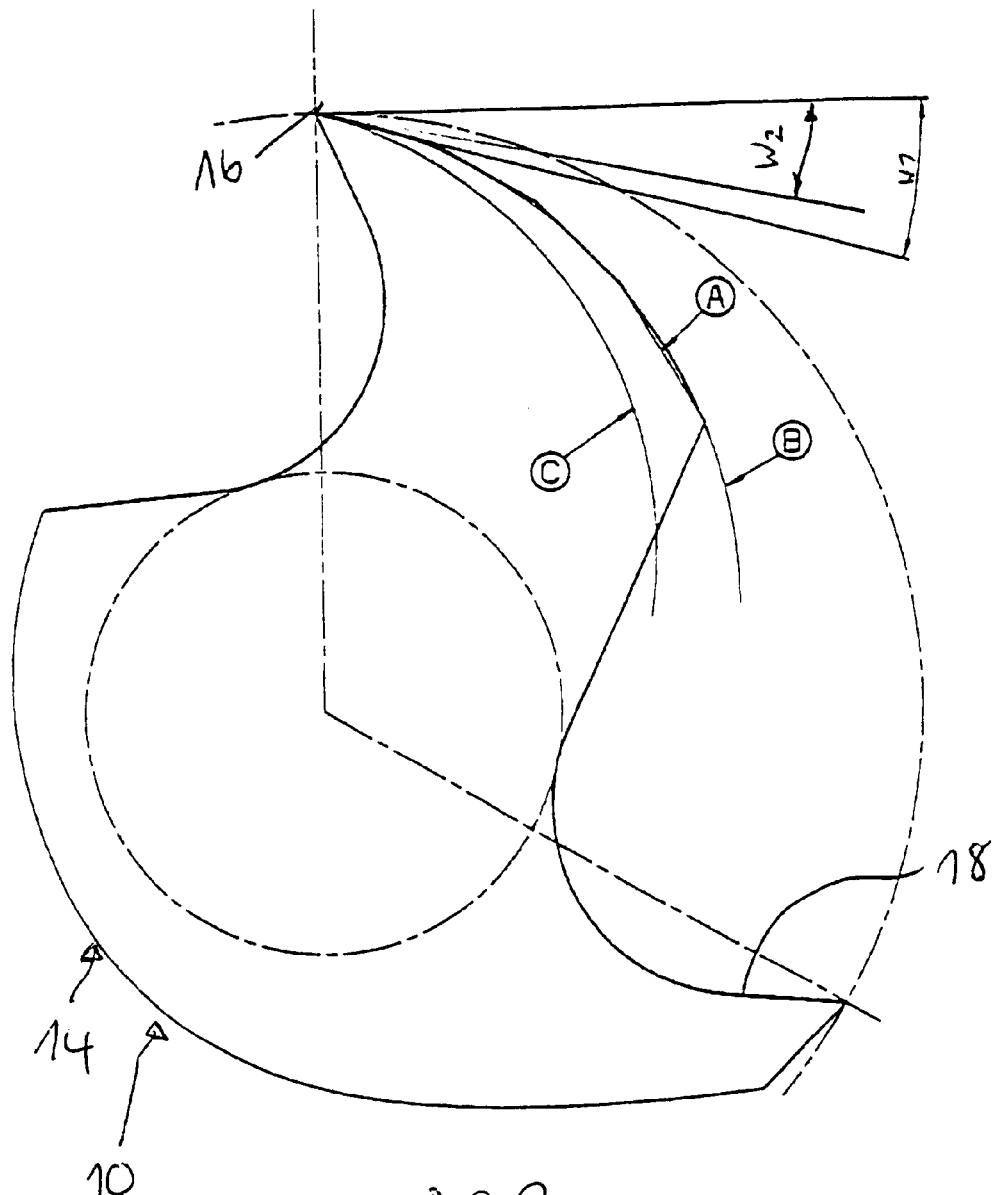
FIG. 3 shows a detail of FIG. 2.

It can be recognized that the wedge angle is relatively small and, thus, forms a sharp cutting profile. Notwithstanding this, the facet-shaped "tooth" is relatively stable, however. If it were desired to achieve the same clearance angle by a crowned profile, e.g. a spiral-shaped one, this would cause the cutting profile to be weakened by far more. This is what clearly ensues from FIG. 3. FIG. C shows the course of the tooth back if the clearance angle is 15°. This is what the facet line A will achieve as well. The reinforcement thus obtained for the tooth can be readily discerned from the drawing. If a spiral-shaped tooth back were formed according to line B the clearance angle $W_2$ obtained would be as small as 10°. The clearance angle $W_1$ of FIG. 3 represents the one for the facet line A and the spiral-shaped line C.

The end milling cutter which is shown allows for an easy-to-cut geometry and can also be used with a roughing profile if a known chip splitter profile is provided in a facetted shape on the first reference surface 20 and one or more of the reference surfaces 22 to 26 that follow. The inventive end milling cutter makes possible positive rake and clearance angles and sharp-bordered cutting edges so that the cutting forces required are small. Large chip-enveloping volumes ensure the smooth discharge of the chips. The cutting edges may be resharpened several times.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An end milling cutter for machining workpieces made of a non-ferrous metal or plastic, comprising a shank portion and a tool portion, the tool portion having an inner core and an outer diameter and at least two or more helically shaped cutting edges between which helically shaped chip flutes are formed to define a cutting surface along with the cutting edges, and a tool flank between the cutting edge and the chip flute which follows next, the rake angle being approximately 20 to 25°, the ratio between the core diameter and the outer diameter being 0.4 to 0.7, the complete tool flank between the cutting edge and the flute being facet-shaped such that it is composed of three or more individual reference surfaces, comprising at least first, second, and third reference surfaces, which are approximately planar and are disposed at an angle with respect to each other as viewed in a circumferential direction, the clearance angle of the first reference surface following the cutting edge being approximately 10 to 20°, and the three or more reference surfaces having the same length.

2. The end milling cutter according to claim 1, characterized in that the clearance angle of the first reference surface is different than that of the clearance angle of the second reference surface.

3. The end milling cutter according to claim 1, characterized in that it is manufactured from a high-speed steel (HSS) or hard cutting metal.

4. The end milling cutter according to claim 1, characterized in that it is provided with a hard coating, preferably a diamond coating.

5. The end milling cutter according to claim 1, characterized in that the clearance angle of the first reference surface has the same clearance angle as that of the second reference surface.

6. The end milling cutter according to claim 1, characterized in that the clearance angle of each of the three or more reference surfaces are equal.

* * * * *